United States Patent
McCormack et al.

(10) Patent No.: US 7,912,209 B1
(45) Date of Patent: Mar. 22, 2011

(54) MANAGING STATISTICAL INFORMATION IN A CONTACT CENTER

(75) Inventors: Tony McCormack, Galway (IE); Neil O'Connor, Galway (IE); Patrick Hession, Galway (IE); Owen Friel, Kildare (IE)

(73) Assignee: Avaya Inc., Basking Ridge, NJ (US)

( * ) Notice: Subject to any disclaimer, the term of this patent is extended or adjusted under 35 U.S.C. 154(b) by 1422 days.

(21) Appl. No.: 11/313,369

(22) Filed: Dec. 21, 2005

(51) Int. Cl.
*H04M 3/00* (2006.01)
(52) U.S. Cl. .............................. 379/266.06; 379/266.01
(58) Field of Classification Search ............ 379/265.01–265.14, 266.01–266.1, 379/309

See application file for complete search history.

(56) References Cited

U.S. PATENT DOCUMENTS

| | | | | |
|---|---|---|---|---|
| 5,170,359 A * | 12/1992 | Sax et al. | ......................... | 702/73 |
| 5,862,203 A * | 1/1999 | Wulkan et al. | ............ | 379/114.02 |
| 6,917,898 B1 * | 7/2005 | Kirubalaratnam et al. | ... | 702/179 |
| 2006/0115074 A1 * | 6/2006 | Hollatz et al. | ............ | 379/265.09 |
| 2010/0077082 A1 * | 3/2010 | Hession et al. | ................ | 709/227 |

* cited by examiner

*Primary Examiner* — William J Deane
(74) *Attorney, Agent, or Firm* — Barnes & Thornburg LLP (57) ABSTRACT

Statistics relating to the operation of physical, logical and software components of a contact center are generated by or on behalf of the components themselves rather than by a statistics engine based on event notifications from the components. In this way, the locally generated statistical information can be communicated as part of presence information for such components. By subscribing to a presence service for presence information for the components of interest, a statistics service can collect the locally produced statistics coming from each component. This provides a less centralised, more dynamic and adaptable way of managing statistical information in a contact center and provides in addition alternative methods of generating alarms and alerts.

20 Claims, 5 Drawing Sheets

MANAGING STATISTICAL INFORMATION IN A CONTACT CENTER

TECHNICAL FIELD

This invention relates to the contact centers and in particular to the management of statistical information in contact centers. The invention also has application in the management of information relating to communications session in contact centers and in the generation of alerts relating to the operation of contact centers.

BACKGROUND ART

Many conventional contact centers employ statistics engines to compile, publish and archive statistics. Statistics are based on the collection of data and on the aggregation and manipulation of such data. In a conventional contact center the basic building blocks of data are events which arise during the operation of the contact center.

Entities such as exchanges, call servers, automated call handling applications, queue managers and agent stations (for example) participate in these events. Examples of such events might include the arrival of a new call (contact) at the exchange, its transfer through automated call handling routines, its positioning in a queue, its allocation to an agent and the eventual termination of the contact. Each such event is generally notified to the statistics engine by the relevant entity and the statistics engine can determine from the totality of the events the wait time of the call, the movement of the call through an individual queue, the time spent by a given agent in dealing with the call, and so on. By aggregating such data for all of the contacts arriving at the contact center in a given period of time, the statistics engine can derive the average call wait time, the relative activity of each queue, the average time spent on a call by each agent and so on.

Such statistics, when calculated by the statistics engine can include both instantaneous and historical statistics (e.g. both current wait time and longest wait time in previous 24 hours). The statistics are usually published selectively in real time for supervisors to use in monitoring and managing the call center, as well as being published to a database for recordal and reporting purposes in the future.

This conventional approach to the collection and calculation of statistics suffers from the fact that it involves proprietary protocols and routines and there is no uniformity between various products. It is also somewhat limited by the fact that it is extremely centralised and the functionality is entirely determined by the operation of the statistics engine.

DISCLOSURE OF THE INVENTION

The invention provides a method of managing statistical information in a contact center, the method involving the steps of:
 (a) a component of the contact center calculating statistics relating to activity of that component;
 (b) the component periodically communicating results of the statistics calculations, as part of an indication of its presence, to a presence service associated with the contact center; and
 (c) the presence service communicating the results to a statistics service which has subscribed to receive the results from the component.

The term "presence" as used in the art of information technology and telecommunications can have a narrow meaning (which is not intended here) simply denoting whether an entity is "open" or "closed", i.e. available or unavailable for communications of specified types. More commonly, however, the term "presence" is used in a broader sense, denoting any aspect of the dynamic profile of an entity which is exposed and made visible to others. It is in this broader sense that the term is used herein.

Providing an indication of presence allows an entity to communicate any information which it wishes about itself, and various protocols allow other entities to watch for or subscribe to that presence information. The present invention, in one aspect, employs presence information as a vehicle for exposing and communicating statistical information which it has itself calculated locally. A statistics service which watches for the arrival of presence data for that entity can receive statistical information rather than mere notifications of events.

The term "contact center" as used herein is intended to denote a facility in which agents handle contacts to or from customers, partners and associates (all of which are generally referred to herein as "customers"). Such contacts can use many communications channels including telephony calls (both public switched and packet-switched), video calls, emails, instant messaging, fax, web chat or any other suitable channel of communication. A typical modern contact center can handle one, all or any combination of those channels. The contact center routes, queues and otherwise manages each of these contact channels. The best known type of contact center is a call center which deals primarily with voice telephony, and for ease of reference, the primary type of contact described herein is that of voice telephony; nevertheless the invention embraces and extends to multimedia contact centers and contacts.

The term "contact center component" or "component of a contact center" as used herein is intended to denote physical components such as agent stations, media servers, exchanges, switches, conference bridges and the like, and also abstract or encoded components such as queues, workflows and applications. Components can comprise a mixture of physical and logical elements, such as an interactive voice response system which comprises a physical server and a software application running on the server.

In contrast with the prior art, the method of the invention does not rely on the communication of simple events to a statistics engine (from which statistics can be derived and calculated); rather it employs the components to themselves carry out statistical calculations and to communicate the results thereof to the presence service. The component may carry out the statistical calculations relating to its own activity by means of a statistical agent which operates in conjunction with the component to carry out the local calculations, particularly when this needs to be done on behalf of relatively inert, dumb, or abstract components.

Because presence can be communicated independently of platform or of any particular protocol, the method provides a non-proprietary method of generating and communicating statistics throughout a contact center. Also because a number of different watchers can subscribe to presence information, the statistical calculations from each component can be communicated to a number of different types of statistics services or can be passed directly to a database.

Preferably, the presence service communicates to the statistics service each result of a statistics calculation received from the component.

This can be implemented by having a statistics service subscribe to receive all results from the identified component (or indeed from all components if more than one is sending statistical results in presence information). Alternatively, a non-subscription model can be used, with the presence service being configured or programmed to automatically communicate all such results to the statistics service.

In an alternative embodiment, the presence service communicates to the statistics service only those results of a statistics calculation received from the component which match predetermined criteria.

Again this can be achieved by having a selective subscription from the statistics service or having the presence service set up to only selectively communicate the results.

The skilled person will appreciate that this option provides the possibility of using presence information to generate alarms and alerts relating to the operation of a given component. When the component's status (as measured by the statistical results communicated in presence information) fulfils an alarm condition, the statistics service can be notified and can act appropriately.

Suitably, the periodic communication of results of the statistics calculations from the component to the presence service may occur at predetermined time intervals.

Alternatively, the periodic communication of results of the statistics calculations from the component to the presence service may occur when a predetermined set of statistics calculations is completed.

In a further alternative, the periodic communication of results of the statistics calculations from the component to the presence service may occur only when the results meet predetermined criteria.

Again, this last option provides a method of generating alarms and alerts, in this case with the determination of an alarm or alert condition being made by the component.

The last mentioned option also allows the statistical results to be communicated when they reach a particular point, such as when a given number of contacts have been disposed of, or when traffic levels to or from the component are determined to be at a particular level, so as to use bandwidth more efficiently.

The component may be selected from an agent station, a media server, a telephone exchange, a call server, a switch and a conference bridge. These examples are not intended to be limiting, and other physical or structural components of the contact center can also be employed in the method of the invention.

The component may also be selected from a queue, a workflow and an application. Again, these examples are not intended to be limiting, and other logical, abstract or encoded components of the contact center can also be employed in the method of the invention.

In a preferred embodiment, the component is a workflow and the activity of the component relates to a communications session following the workflow, whereby the results of the statistical calculations provide an indication of the state of the communications session to the presence service.

This allows the presence service to communicate the indication of the state of the communications session to a party requesting such information.

In a particularly preferred embodiment, the party is a party to the communications session.

In this way, a party in communication with a contact center can subscribe to receive from the presence service an indication of the progress of his or her contact by being updated with changes in the presence information from the workflow handling the contact.

In a preferred embodiment, the presence service is a session initiation protocol (SIP) presence service.

In one embodiment, the presence service is dedicated to managing the presence information for a single component.

One currently proposed model for SIP presence (which is documented in the Internet Engineering Task Force (IETF) standardization effort known as "SIP for Instant Messaging and Presence Leveraging Extensions" or SIMPLE) allows each entity generating presence information (or presentity) to have its own dedicated presence agent or service. Watchers (entities which have subscribed to be notified of changes to the presence of such presentities) communicate directly with the presence agent for the presentities being watched and receive notifications of changes to presence directly therefrom. A description of a generalised model for implementing presence extensions to SIP can is published by the IETF as a Request for Comments document (No. 3856) at http://www.ietf.org/rfc/rfc3856.txt (see also www.ietforg/html.charters/simple-charter.html).

Another implementation of a presence protocol which can be used in the present invention is the XML-based XMPP (or "Extensible Messaging and Presence Protocol") which was designed and is currently maintained by the Jabber Software Foundation. It is the base of the Jabber instant messaging protocol, and is described inter alia in IETF RFC documents 3920, 3921, 3922 and 3923.

Alternatively, and in a currently preferred embodiment, the presence service communicates with and receives presence information from a plurality of such components.

This embodiment, also documented in the SIMPLE model, employs presence servers to run the presence servers and to receive presence information from the presentities (or more particularly, from "presence user agents" associated with each presentity). Watchers subscribe to the presence server in respect of identified presentities and receive notifications from the presence server when the identified presentities publish changes to their presence information.

Preferably, the step of the presence service communicating the results to the statistics service occurs as a consequence of the statistics service subscribing to receive the results from the presence service.

The invention also provides a computer program provided as a product having machine readable instructions. When executed in a processor of a contact center component these instructions are effective to cause the component to:
 (a) calculate statistics relating to activity of that component; and
 (b) periodically communicate results of the statistics calculations as part of an indication of its presence to a presence service associated with the contact center;
whereby the presence service may communicate the results to a statistics service which has subscribed to receive the results from the component.

Additionally, the invention provides a contact center which includes:
 (a) a presence service for receiving and managing presence information received from one or more components of the contact center and for selectively communicating the presence information to entities which subscribe for such information;
 (b) a plurality of interacting logical and physical components for collectively handling communications with parties external to the contact center, at least one of the components comprising:
  (i) a statistical calculator for carrying out statistics calculations relating to activity of that component; and
  (ii) a presence information generator for generating presence information and communicating the presence information to the presence service, the presence information including results of the statistics calculations;

(c) a statistics service operable to receive from the presence service the results of statistics calculations relating to activity of the at least one component and for managing the results.

In another aspect the invention provides a method of generating alerts within a contact center system when operating parameters of a component of the contact center system meet predetermined criteria, the method involving the steps of:
(a) the component of the contact center calculating operating parameters relating to activity of that component;
(b) the component of the contact center comparing the parameters with the predetermined criteria;
(c) on determining that the parameters meet the predetermined criteria, the component communicating the determination as part of an indication of its presence to a presence service associated with the contact center;
(d) the presence service communicating the determination to an alert generation service which has subscribed to receive the results from the component; and
(e) the alert generation service generating an alert in response to the determination.

In this aspect, a component of the contact center makes a determination that its operation has met certain predetermined conditions (e.g. an alert/alarm condition) and this causes the issuance of a notification of a presence state identifying the alert/alarm, which is then acted on by the alert generation service.

The invention also provides as part of the same aspect, a computer program product comprising machine readable instructions which when executed in a processor of a contact center component are effective to cause the component to:
(a) calculate operating parameters relating to activity of that component;
(b) compare the parameters with predetermined criteria to determine whether the operating parameters meet the predetermined criteria; and
(c) on determining that the parameters meet the predetermined criteria, communicate the determination as part of an indication of the component's presence to a presence service associated with the contact center;
whereby the presence service may communicate the determination to an alert generation service which has subscribed to receive the results from the component and the alert generation service may generate an alert in response to the determination.

The invention further provides a contact center comprising:
(a) a presence service for receiving and managing presence information received from one or more components of the contact center and for selectively communicating the presence information to entities which subscribe for such information;
(b) a plurality of interacting logical and physical components for collectively handling communications with parties external to the contact center, at least one of the components comprising:
  (i) a monitor for monitoring operating parameters relating to the activity of that component and comparing the operating parameters with predetermined criteria to make a determination that the operating parameters meet the criteria; and
  (ii) a presence information generator for generating presence information and communicating the presence information to the presence service, the presence information including, when the determination has been made, an indication of the determination;
(c) an alert generation service operable to receive from the presence service the determination communicated by the presence agent of the at least one component and for generating an alert in response to the determination.

In another aspect the invention provides a method of managing information relating to a communications session managed by a communications session manager of a contact center, comprising the steps of:
(a) the communications session manager maintaining a record of the current status of the communications session;
(b) the communications session manager periodically providing presence information to a presence service, wherein the presence information includes an indication of the status of the communications session; and
(c) the presence service making the indication of the status of the communications session available to a party to the communications session.

The invention further provides in this aspect a computer program product comprising machine readable instructions which, when executed in a processor of a communications session manager of a contact center which is managing a communications session, are effective to cause the communications session manager to:
(a) maintain a record of the current status of the communications session; and
(b) periodically provide presence information to a presence service, wherein the presence information includes an indication of the status of the communications session;
whereby the presence service may make the indication of the status of the communications session available to a party to the communications session.

BRIEF DESCRIPTION OF THE DRAWINGS

The invention will now be further illustrated by the following description of embodiments thereof given by way of example only with reference to the accompanying drawings, in which.

DETAILED DESCRIPTION OF PREFERRED EMBODIMENTS

Figure 1:
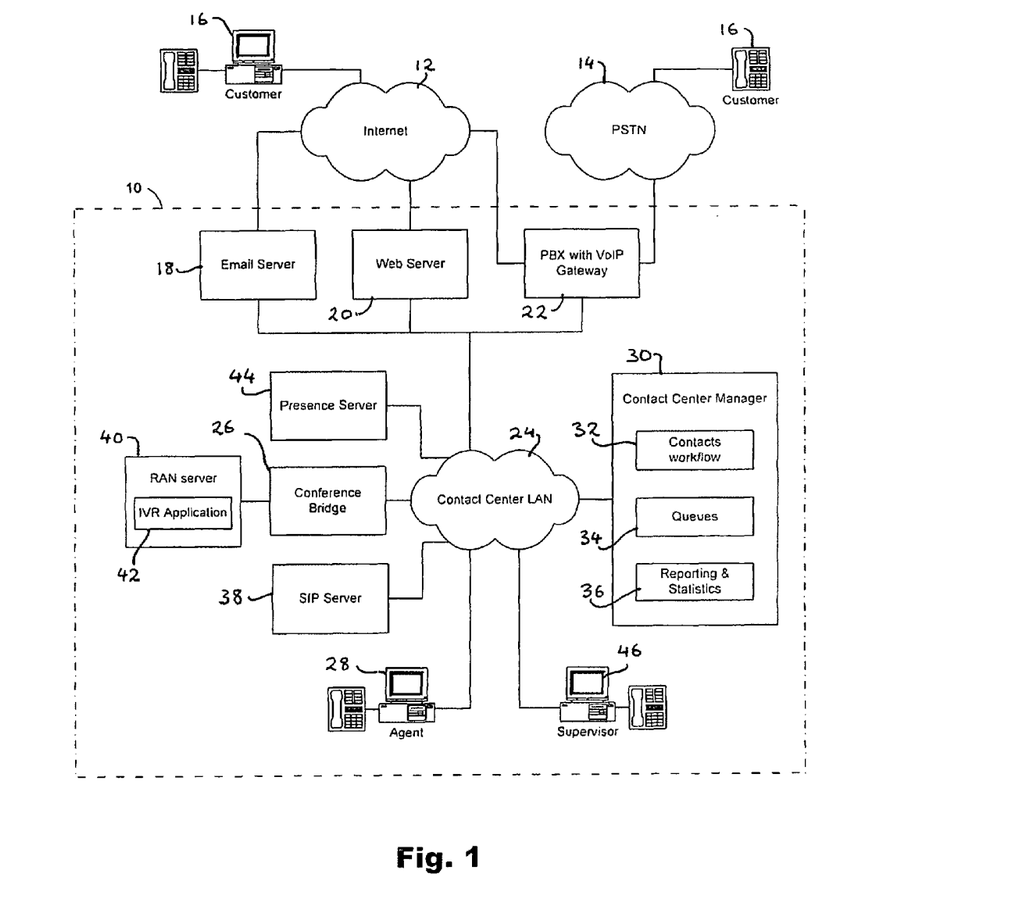
FIG. 1 shows an architecture of a contact center in accordance with the invention.

In FIG. 1 there is indicated, generally at 10, a contact center which is connected both to the Internet 12 and to the public switched telephone network (PSTN) 14. Customers 16 can connect via either the Internet or the PSTN to the contact center generally, and in particular can connect to an email server 18, a web server 20 or (most usually) a private branch exchange (PBX) 22 equipped with a voice over Internet protocol (VoIP) gateway and/or a video interface.

The contact center 10 has a local area network (LAN) 24 which connects each of the servers 18, 20, 22 with a conference bridge 26. A plurality of agents 28 (one of whom is indicated in FIG. 1) are also each connected using an agent workstation which is a personal computer equipped with agent client software providing multimedia capabilities to the contact center LAN.

It is to be understood that agents may be connected also to the contact center via the Internet 12 or via a wide area network, and they can also be connected over the PSTN. Such distributed contact center architectures are well known and the present invention is not limited to any particular architecture of contact center.

Customers contact the contact center by, for example, making a voice or video call over the Internet or the PSTN which is handled by the PBX 22, or making a submission which the contact center receives via the web server 20 (such as a web form or an Internet chat session hosted by the web server), or by sending an email which is received at the email server 18.

In any event, when such a contact is received at the respective server, a contact center manager 30 is notified of the existence of a new contact. The contact center manager 30 performs a number of functions some of which are indicated generically such as a contacts workflow 32, a set of logical queues 34 and a reporting and statistics function 36.

As the skilled person will appreciate, each of these functions is typically implemented by appropriate software elements forming part of an overall contact center management application. This does not exclude the possibility that a contact center manager can be implemented purely in hardware or as a hybrid.

In any event, the contacts workflow 32 generates a new contact entity which records details of the received contact such as the time it was received, its source, any customer details which can be deduced based on the source (e.g. the caller line ID might be used to reference a customer profile in a database), and the nature of the contact (e.g. customers may have access to a first communication channel for sales or a second communication channel for technical support, etc.).

In order to increase the sophistication of the contact handling, the customer is typically directed first through an automated process to acquire more information which will allow the contact to be better directed. Again, the skilled person will be familiar with the techniques which can be used and therefore only a brief description of a typical method of contact handling will be given.

The most common contact type in current contact centers is voice calls, and as indicated above, such calls are initially handled by the PBX. The contacts workflow 32, following the generation of a contact, instructs the PBX 22 to transfer the call to the conference bridge 26. This bridge effectively generates an ad hoc conference into which the customer's call is placed.

Transfer of calls and communication generally between contact center components is accomplished using the session initiation protocol (SIP), with which the skilled person will be familiar and the implementation of which is carried out by a SIP server (location server) 38.

A recorded announcement (RAN) server 40 is connected into the same conference and a script is run by an interactive voice response (IVR) application 42 on the RAN server which plays back various recorded announcements and accepts inputs from the customer in response to such announcements in order to either dispose of the contact (if automated handling can satisfy all of the needs of that particular customer) or to determine the skillset(s) required for an agent to handle the customer.

When the IVR script has terminated, the information gleaned from this session is passed back to the contact manager to update the contact and to more appropriately queue it. At that time, the customer could typically be provided with a media feed from a media server (not shown).

Meanwhile, the contact is placed in an appropriate skillset queue within the queues area 34. The number and nature of different skillset queues is selected by the designers of the contact center and is of little importance to the understanding of this invention. Contacts are prioritised as appropriate and are normally served from the top of the queue. Thus, the customer will remain on hold, listening to recorded music, for example, until the contact token associated with that customer reaches the top of a queue, at which point the contact is assigned to an agent 28 having the skillset abilities to deal with that contact.

The operation of the contact center thus far described is conventional and is provided to place the invention in context.

The contact center 10 is additionally provided with a presence server 44 which can communicate with all of the other contact center components (whether physical, software-based, or logical) via the LAN 24.

Figure 2:
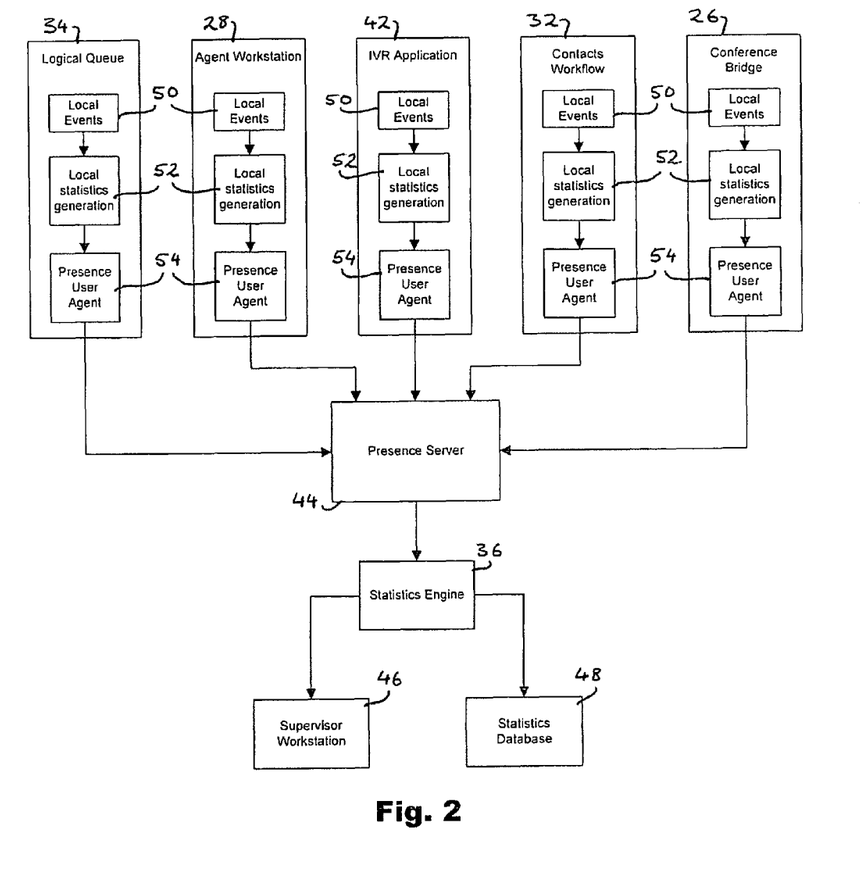
FIG. 2 shows selected elements of the contact center of FIG. 1, illustrating the generation and communication of statistical information within the contact center.

Thus, as shown in FIG. 2, the presence server is connected with a logical queue component 34, agent workstation component 28, IVR application component 42, contacts workflow component 32, and conference bridge component 26.

Each of these components is provided, either inherently or by means of plug-in or add-on agents, with:
functionality for detecting local events 50 relevant to the operation of the component in question;
a local statistics generation module 52 for receiving event notifications and for generating local statistics therefrom, and
a presence user agent 54 which incorporates the results of the statistics calculations into presence information and passes the presence information to the presence server 44.

Thus, for example, the logical queue 34 would give rise to events such as contact tokens entering and leaving the queue, priorities being allocated to certain tokens, the assignment and de-assignment of agents to and from the queue and so on. These events would be notified by the local events module 50 to the local statistics generation module 52 and the latter module would generate statistics describing the functioning of the queue.

Similarly, the agent workstation 28 would generate statistics relating to the performance of the agent located at that workstation, the IVR application 42 would generate statistics relating to the operation of the IVR function of the contact center and so on.

Of special note, however, is the contacts workflow 32. This component has an overview of all of the significant changes occurring as a result of the treatment of each individual contact, and thus the local events module 50 can track events by contact (i.e. communications session) and can notify and identify such events to the statistics generation module 52 so that statistics can be generated on a per contact basis if desired. Such statistics are, as with the other components, communicated to the relevant presence user agent 54.

The components shown in FIG. 2 include primarily physical components (e.g. the conference bridge), components relying on a mix of hardware and software (e.g. the agent workstation), primarily software components (e.g. the IVR application and the contacts workflow) and purely logical components (the queue).

Figure 3:
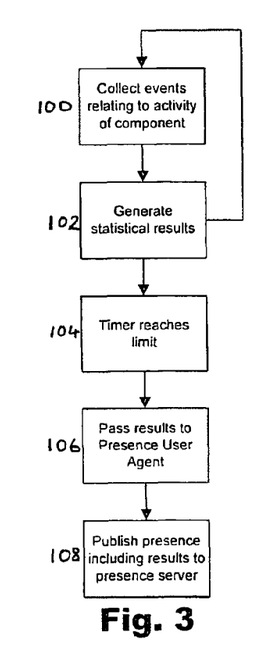
FIG. 3 is a flowchart illustrating a first mode of operation of a contact center component.

Each component (insofar as it is relevant to the operation of the invention) can be considered to operate according to the same principles. Referring to FIG. 3, a workflow illustrating such operation is provided. Events are collected, step 100, relating to the operation of the component in question. From these events, statistical results are generated which describe the operation of the component and its interaction with other components. This continues in a loop as shown in the workflow.

In the mode of operation illustrated in FIG. 3, a timer operates to prompt for the transmission of results at fixed periods. When the timer reaches its limit, step 104, the statistics module 52 passes its results to the presence user agent 54, step 106. The presence user agent is programmed to generate presence information and to include, as part of such information, the results of the statistics calculations. The presence information is published to the presence server 44 (FIG. 2).

Before considering the ultimate destination of the statistical information, two variations on this flowchart will be described.

Figure 4:
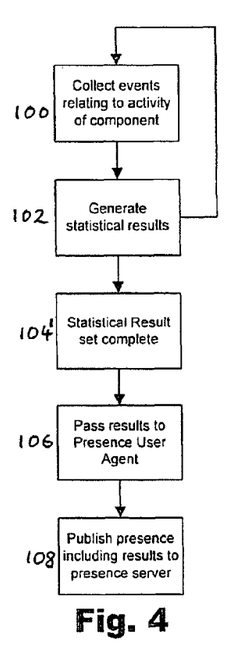
FIG. 4 is a flowchart illustrating a second mode of operation of a contact center component.

In FIG. 4, steps 100, 102, 106 and 108 are precisely as described for FIG. 3. The difference lies in that a timer is not used to determine when the statistics results are provided to the presence user agent in step 106. Rather, statistics are calculated according to a protocol until a result set (as defined in that protocol) has been completed, step 104'. This might, in very simple terms, be when a set number of contacts have been processed, or when an agent goes off duty, thereby ending the collection of that batch of statistics.

Figure 5:
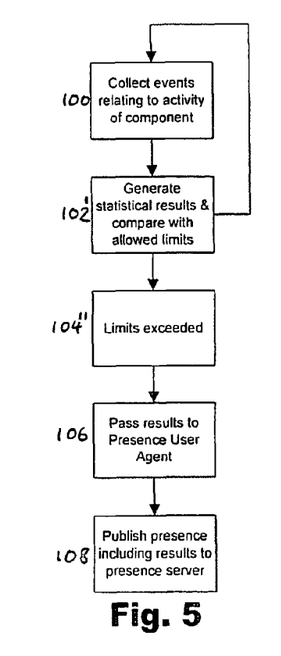
FIG. 5 is a flowchart illustrating a third mode of operation of a contact center component.

FIG. 5 shows a further variation with two important differences from the process described in FIG. 3. Rather than simply generating statistical results in step 102, the process of FIG. 5 both generates results and compares them with predetermined allowed limits, step 102'.

Only in the case that the limits are exceeded, step 104", are the results passed to the user agent. This is a simple and effective method of delegating to the component itself the evaluation of alert/alarm criteria.

The process of FIG. 5 can be employed for components where statistical information is not required when normal parametric operation is taking place, and information about the component only needs to be passed along when thresholds are exceeded or there is some other variation from predetermined conditions.

Alternatively, the process of FIG. 5 can operate in parallel with the process of either FIG. 3 or 4, so that one process looks after the normal generation of statistical information and the other process (FIG. 5) varies the presence information in the case of an alert/alarm situation.

As each process concludes in step 108 with the publication of presence information to the presence server (or more generally, to a presence service), consideration will now be given as to how this presence information, and in particular the statistical results or alarm/alert notification therein, are used.

FIGS. 1 and 2 show a statistics module or statistics engine 36 (more generally, some statistics service) which receives statistical results from the presence server 44 and which provides them, according to programmed criteria (and optionally after having carried out further calculations based on the aggregation of results from various components), to a supervisor workstation 46 and/or a statistics database 48 (not shown in FIG. 1).

Figure 6:
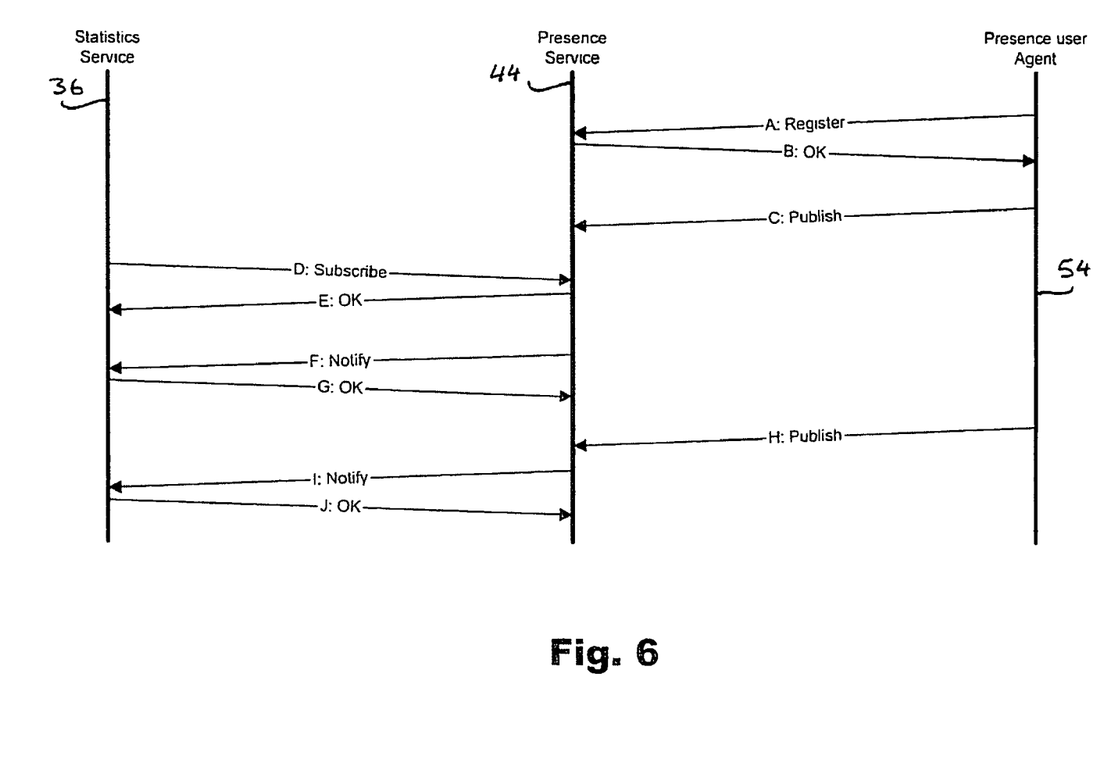
FIG. 6 is a message flow diagram showing the communication of presence information in the contact center of FIG. 1.

FIG. 6 shows one method of communicating the results between the various presence user agents 54, the presence server 44, and the statistics engine 36 using a conventional message flow diagram. First (message A) the presence user agent or PUA registers with the presence service which acknowledges successful registration (message B). When various components of the contact server go on-line and off-line, they would register and de-register in this way so that the presence service knows which PUAs are expected to send presence information When the PUA has a change in its presence information (such as when new presence information including new statistical results is generated) it publishes such information to the presence server (message C). One message format for use in publishing presence information is the Presence Information Data Format (PIDF) defined in IETF RFC document 3863. This format allows the presence information to be extended with user defined additions over and above simple indications of availability.

Therefore following registration of any given PUA 54, the presence server 44 can be expected to have a current indication of the presence condition of the PUA by means of publication messages.

The statistics service or engine 36 plays the role of a watcher of PUA 54 in this model and to the end, it subscribes (message D) to receive presence information from PUA 54. The subscription can be for all information received by the presence service 44 from PUA 54 (subject to the PUA having authorised this to be passed to the statistics service, which is assumed in this case), or the subscription can be for presence information which meets certain criteria. The latter option gives another method of implementing statistics-based alert and alarms, i.e by putting in place a subscription for statistics results from (say) a queue only where the results indicate an average current wait time of greater than 5 minutes, another simple and effective alert/alarm method is provided.

Following confirmation of successful subscription (message E), the presence service provides the statistics service with an initial notification (message F) of the most recent presence information from the PUA to which the subscription relates and this is acknowledged in message G.

It should be pointed out here that the statistics service will normally be configured to subscribe for presence information from each component which is expected to generate statistical results, particularly in view of the statistics service's role in archiving the results to the database 48.

When the PUA 54 publishes new presence information (message H), normally in response to the periodic generation of statistical calculation results from its associated statistics module, the presence service will notify (message I) such new presence information to all subscribed parties (which thus far is only the statistics service), following which an acknowledgement is returned (message J).

In this way, the statistics service is immediately notified of all new statistical information emanating from each component for which it is subscribed to receive information.

The skilled person will appreciate that this provides a far more flexible and dynamic way of gathering and of distributing statistical information. In particular, in the context of networked contact centers (where a number of independent contact centers may act in concert with one another to imitate a single entity) flexible and dynamic operation modes are needed. Such arrangements are increasingly common, as are contact centers which can be hired out (i.e. by becoming a virtual part of another center) to supplement the capacities of existing centers.

In the case where the statistical information relates to a particular contact session (as was described above in relation to the events and statistics from the contacts workflow 32, FIG. 2), an additional opportunity arises. In addition to granting permission to the statistics service to view such presence information, the presence information for a given communications session could be flagged as available for viewing by the external party who is involved in that session (e.g. the customer). This would enable the customer to submit to the presence server 44 a subscription for the presence information relating to his or her own communications session. Any changes to the presence information would then be notified to that customer as well as to the statistics service, based on a message flow paralleling that shown in FIG. 6. In this way, the customer would be alerted to changes normally hidden to outside parties, such as perhaps the queue to which the contact was allocated, the skillsets considered to be required to service the contact, the position in the queue, the current wait time, the direct dial number and email address of the agent to whom the contact was allocated. and so on.

Figure 7:
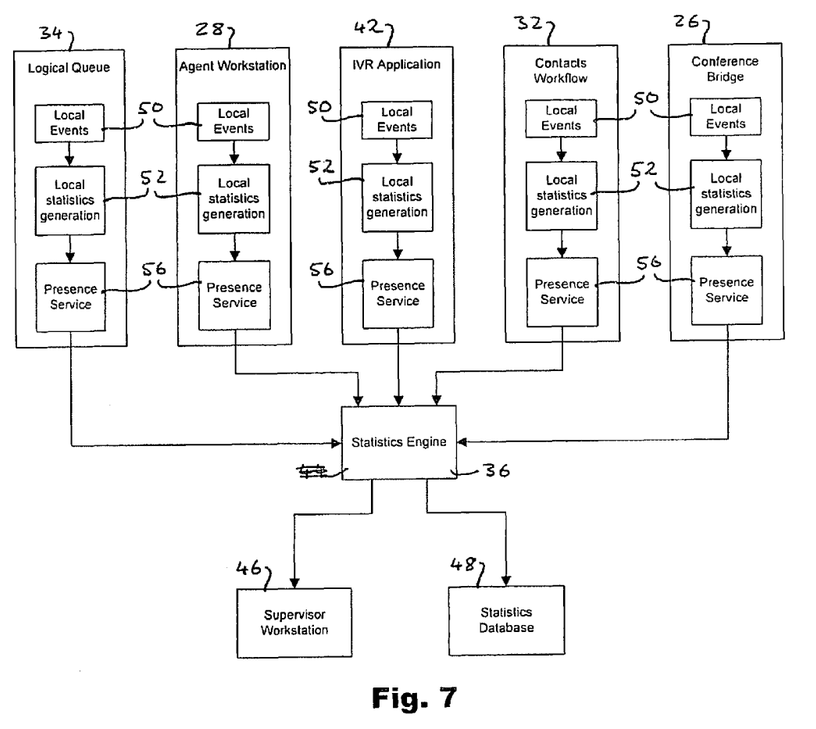
FIG. 7 shows selected elements of an alternative contact center to that shown in FIG. 2, illustrating the generation and communication of statistical information within the contact center.

A variation on the previously described embodiment is illustrated in FIG. 7. This embodiment omits the need for a separate presence server. It is possible for a presence service to be co-located with a presence user agent and for watchers to subscribe directly with the dedicated presence service of the presentity in which they are interested, and this is the case with the embodiment of FIG. 7.

In FIG. 7, there are man similarities with FIG. 2 and accordingly, like reference numerals are used to denote like components, which will not be described further. The main difference is the absence of the presence server 44 and the replacement of the presence user agent with a dedicated presence service 56 (which incorporates the functionality of the presence user agent) for each of the five components 34, 28, 42, 32, 26.

The statistics engine 36 therefore subscribes separately to each of the five presence services in order to receive directly from each component the presence information (including statistical results or alert conditions) from that component.

Such an embodiment can nevertheless be considered to operate according to whichever of the processes of FIGS. 3-5 is selected, given that the presence service of each component is considered to include the functionality of a presence user agent (namely the generation of presence information for that component and its communication (publication) to the presence service which notifies such information to subscribing parties. The only step of FIG. 6 which is changed in operating the embodiment of FIG. 7 is the step of the PUA registering with the presence service, since the relationship between these two integrated components in FIG. 7 is fixed.

The invention is not limited to the embodiments described herein which may be modified without departing from the scope of the claimed invention.

We claim:

1. A method of managing statistical information in a contact center comprising the steps of:
    (a) a component of said contact center calculating statistics relating to activity of that component;
    (b) said component periodically communicating results of said statistics calculations as part of an indication of its presence to a presence service, said presence service being dedicated to and co-located with the component; and
    (c) said presence service communicating said results to a statistics service which has subscribed to receive said results from said component.

2. A method of managing statistical information as claimed in claim 1, wherein said presence service communicates to said statistics service each result of a statistics calculation received from said component.

3. A method of managing statistical information as claimed in claim 1, wherein said presence service communicates to said statistics service only those results of a statistics calculation received from said component which match predetermined criteria.

4. A method of managing statistical information as claimed in claim 1, where said periodic communication of results of said statistics calculations from said component to said presence service occurs at predetermined time intervals.

5. A method of managing statistical information as claimed in claim 1, wherein said periodic communication of results of said statistics calculations from said component to said presence service occurs when a predetermined set of statistics calculations is completed.

6. A method of managing statistical information as claimed in claim 1, wherein said periodic communication of results of said statistics calculations from said component to said presence service occurs only when said results meet predetermined criteria.

7. A method of managing statistical information as claimed in claim 1 wherein said component is selected from an agent station, a media server, a telephone exchange, a call server, a switch and a conference bridge.

8. A method of managing statistical information as claimed in claim 1 wherein said component is selected from a queue, a workflow and an application.

9. A method as claimed in claim 8, wherein said component is a workflow and wherein said activity of said component relates to a communications session following said workflow, whereby the results of said statistical calculations provide an indication of the state of said communications session to said presence service.

10. A method as claimed in claim 9, further comprising the step of the presence service communicating said indication of the state of the communications session to a party requesting said indication.

11. A method as claimed in claim 10, wherein said party is a party to said communications session.

12. A method of managing statistical information as claimed in claim 1 wherein said presence service is a session initiation protocol (SIP) presence service.

13. A method of managing statistical information as claimed in claim 1 wherein said step of said presence service communicating said results to said statistics service occurs as a consequence of said statistics service subscribing to receive said results from said presence service.

14. A method of managing statistical information as claimed in claim 1 further comprising generating alerts within the contact center system when operating parameters of the component of said contact center system meet predetermined criteria, comprising wherein said generating alerts comprises the steps of:
    (a) said component of said contact center calculating operating parameters relating to activity of that component;
    (b) said component of said contact center comparing said parameters with said predetermined criteria;
    (c) on determining that said parameters meet said predetermined criteria, said component communicating said determination as part of an indication of its presence to a presence service associated with said contact center;
    (d) said presence service communicating said determination to an alert generation service which has subscribed to receive said results from said component; and
    (e) said alert generation service generating an alert in response to said determination.

15. A method of managing statistical information as claimed in claim 1 further comprising managing information relating to a communications session managed by a communications session manager of the contact center, comprising the steps of:
(a) said communications session manager maintaining a record of the current status of the communications session;
(b) said communications session manager periodically providing presence information to said presence service, wherein said presence information includes an indication of the status of said communications session; and
(c) said presence service making said indication of the status of said communications session available to a party to said communications session.

16. A computer program product comprising a non-transitory computer-readable medium, arranged to at least one of store and record, program instructions in machine readable form, wherein the program instructions when executed in a processor of a contact center component are effective to cause said component to:
(a) calculate statistics relating to activity of that component; and
(b) periodically communicating results of said statistics calculations as part of an indication of its presence to a presence service, said presence service being dedicated to and co-located with the component;
whereby the presence service may communicate the results to a statistics service which has subscribed to receive the results from the component.

17. A computer program product as claimed in claim 16, wherein the program instructions, when executed in a processor of a contact center component are further effective to cause said component to:
(a) calculate operating parameters relating to activity of that component;
(b) compare said parameters with predetermined criteria to determine whether said operating parameters meet said predetermined criteria; and
(c) on determining that said parameters meet said predetermined criteria, communicate said determination as part of an indication of said component's presence to said presence service associated with said contact center
whereby said presence service may communicate said determination to an alert generation service which has subscribed to receive said results from said component and said alert generation service may generate an alert in response to said determination.

18. A computer program product as claimed in claim 16, wherein the program instructions, when executed in a processor of a communications session manager of a contact center which is managing a communications session, are effective to cause said communications session manager to:
(a) maintain a record of the current status of the communications session; and
(b) periodically provide presence information to said presence service, wherein said presence information includes an indication of the status of said communications session;
whereby said presence service may make said indication of the status of said communications session available to a party to said communications session.

19. A contact center comprising:
(a) a plurality of interacting logical and physical components for collectively handling communications with parties external to said contact center, at least one of said components comprising:
(i) a statistical calculator for carrying out statistics calculations relating to activity of that component;
(ii) a presence information generator for generating presence information and communicating said presence information to a dedicated presence service, said presence information including results of said statistics calculations; and
(iii) the dedicated presence service for receiving and managing presence information received from said presence information generator and for selectively communicating said presence information to entities which subscribe for such information;
(b) a statistics service operable to receive from said presence service said results of statistics calculations relating to activity of said at least one component and for managing said results.

20. A contact center according to claim 17 wherein said plurality of interacting logical and physical components further comprises:
(c) a monitor for monitoring operating parameters relating to said activity of that component and comparing said operating parameters with predetermined criteria to make a determination that said operating parameters meet said criteria; and wherein said presence information including, when said determination has been made, an indication of said determination;
(d) an alert generation service operable to receive from said presence service said determination and for generating an alert in response to said determination.

* * * * *

UNITED STATES PATENT AND TRADEMARK OFFICE
CERTIFICATE OF CORRECTION

| | | |
|---|---|---|
| PATENT NO. | : 7,912,209 B1 | Page 1 of 1 |
| APPLICATION NO. | : 11/313369 | |
| DATED | : March 22, 2011 | |
| INVENTOR(S) | : Tony McCormack et al. | |

It is certified that error appears in the above-identified patent and that said Letters Patent is hereby corrected as shown below:

Col. 12, Line 51, Claim 14, "comprising" should be deleted

Col. 14, Line 34, Claim 20, "17" should be 19

Signed and Sealed this
Seventeenth Day of May, 2011

David J. Kappos
*Director of the United States Patent and Trademark Office*